(12) United States Patent
Nath et al.

(10) Patent No.: US 8,942,191 B2
(45) Date of Patent: Jan. 27, 2015

(54) PROVIDING DYNAMIC GROUP SUBSCRIPTIONS FOR M2M DEVICE COMMUNICATION

(75) Inventors: Badri Nath, Edison, NJ (US); Rakesh Kushwaha, Marlboro, NJ (US)

(73) Assignee: Mformation Software Technologies LLC, Woodbridge, NJ (US)

( * ) Notice: Subject to any disclaimer, the term of this patent is extended or adjusted under 35 U.S.C. 154(b) by 442 days.

(21) Appl. No.: 12/772,721

(22) Filed: May 3, 2010

(65) Prior Publication Data

US 2011/0268047 A1 Nov. 3, 2011

(51) Int. Cl.
*H04W 72/04* (2009.01)
*H04W 4/08* (2009.01)
*H04W 4/00* (2009.01)
*H04W 8/18* (2009.01)

(52) U.S. Cl.
CPC ............... *H04W 4/08* (2013.01); *H04W 4/005* (2013.01); *H04W 8/186* (2013.01); *H04W 8/18* (2013.01)
USPC ........................ 370/329; 455/435.1

(58) Field of Classification Search
USPC ................ 370/252, 260, 312, 329; 455/435.1
See application file for complete search history.

(56) References Cited

U.S. PATENT DOCUMENTS

| | | | |
|---|---|---|---|
| 6,097,963 A | 8/2000 | Boltz | |
| 6,336,777 B1 | 1/2002 | Fisher | |
| 6,658,253 B1 | 12/2003 | Berggren et al. | |
| 7,170,863 B1 * | 1/2007 | Denman et al. | 370/260 |
| 7,376,750 B1 | 5/2008 | Simu | |
| 7,505,769 B2 | 3/2009 | Jiang | |
| 2002/0193100 A1 | 12/2002 | Riffe | |
| 2004/0240887 A1 * | 12/2004 | Shimada et al. | 398/140 |
| 2004/0249887 A1 * | 12/2004 | Garcia-Martin et al. | 709/204 |
| 2005/0164702 A1 | 7/2005 | Carlson | |
| 2008/0096555 A1 * | 4/2008 | Herrmann | 455/435.1 |
| 2008/0242285 A1 | 10/2008 | Riffe | |
| 2009/0092055 A1 * | 4/2009 | Balasubramanian et al. | 370/252 |

(Continued)

FOREIGN PATENT DOCUMENTS

WO 2005017693 A2 2/2005

OTHER PUBLICATIONS

Written Opinion of the International Searching Authority dated Nov. 9, 2011, received in corresponding International search Authority PCT/US11/34950.

(Continued)

*Primary Examiner* — Myron K Wyche
(74) *Attorney, Agent, or Firm* — Brosemer, Kolefas & Assoc. LLC

(57) ABSTRACT

A method, system, and computer program product for providing dynamic group subscriptions for M2M device communication provides a more flexible and efficient technology for allocating registrations and resources. A method for allocating a plurality of subscriptions to wireless services in a network among a plurality of wireless devices in the network comprises creating a group including a plurality of wireless devices, making an initial allocation of the subscriptions to the group, the initial allocation including allocating one subscription to each of some of the plurality of wireless devices, modifying the allocation of the subscriptions to the group, including at least one of deallocating a subscription from one of the plurality of wireless devices and allocating a subscription to one of the plurality of wireless devices.

36 Claims, 8 Drawing Sheets

(56) References Cited

U.S. PATENT DOCUMENTS

2009/0093255 A1     4/2009    Balasubramanian
2010/0080163 A1*   4/2010    Krishnamoorthi et al. ... 370/312

OTHER PUBLICATIONS

International Search Report dated Nov. 9, 2011, received in corresponding International Application No. PCT/US11/34950.

* cited by examiner

Fig. 4

| 402 Group Identifier | 404 Group Metadata | 406 Device Table | | |
|---|---|---|---|---|
| | | 408 Device ID | 410 Activation State | 412 Resource |
| G1 | Device range | D1 | Y | IMSI1, MSISDN1 |
| | Allocated =2 | D2 | N | D2 |
| | | D3 | Y | IMSI3, MSISDN2 |
| | | D4 | N | D4 |

| Group Identifier | Group Metadata | Device Table | | |
|---|---|---|---|---|
| | | Device ID | Activation State | Resource |
| G3 | Device range | D1 | Y | ESN1, MSISDN1 |
| | Allocated =3 | D2 | Y | ESN2, MSISDN2 |
| | | D3 | N | D3 |
| | | D4 | N | ESN4, MSISDN3 |

400

PROVIDING DYNAMIC GROUP SUBSCRIPTIONS FOR M2M DEVICE COMMUNICATION

BACKGROUND OF THE INVENTION

1. Field of the Invention

The present invention generally relates to allocating resources to a group or a plurality of Mobile-to-Mobile (M2M) devices on an on-demand basis in wireless communication networks and in particular, relates to treating a group of devices as equivalent to one or more subscription to such services.

2. Description of the Related Art

Machine-to-Machine (M2M) devices are devices that use network resources to communicate with other remote devices. Examples of such devices include RFID tags, sensors, smart meters, health care devices, telemetry telematics, supply-chain devices, personal navigation devices, point-of-sales devices, digital signage, vending machines, and automobiles, all of which may need to occasionally or periodically communicate with a remote application or equipment. Such devices may be connected to a network either wirelessly or wired, and may also be connected to the Internet or one or more other networks. The need for such communication arises for a number of reasons, such as due to remote monitoring, management, software or firmware upgrades, reading storage, or updating storage in these devices. These devices are now being provided with the integral capability to communicate over wireless communication networks.

Typically, mobile operators or service providers charge users on a per-subscription or on a per line basis. A typical phone bill consists of charges accrued for each phone or line. The subscription charge or line charge is typically for using the network equipment for registration and the assignment of a phone number, IP address or a user account. Additional service charges are also included that reflect any service plan such as messaging, data, video, etc. Once activated, a device becomes operational and can continue to use the services until the time that the network operator or the subscriber decides to terminate the subscription. The fee structure or tariff for a subscriber that uses wireless communication networks assumes certain usage patterns typically associated with human beings using voice and data services. Hence, each device is considered to correspond to a subscription, with several devices belonging to a subscriber. The rate plans are designed with a specific revenue model based on ARPU (Average Revenue Per User).

M2M devices, similarly to mobile phones, use network resources to communicate with external entities. Many of these devices operate autonomously, or with to user interaction, to monitor, track, sense, or control the environment in which they are deployed. Typically, these devices communicate over a wireless network. The wireless network could be any communication network, for example, GSM, CDMA, WiMAX, LTE, WiFi, etc., but is not limited to currently known wireless radio technologies. These networks provide radio base stations that are connected to the core network and the devices communicate over radio frequencies via the base stations.

In order for these devices to communicate over the network, the devices have to be registered with the network. The prior art allows subscriber registration to be mapped to a single device or toggled between devices. However, this technique is restrictive and inefficient. A need arises for a more flexible and efficient technology for allocating registrations and resources.

SUMMARY OF THE INVENTION

A method, system, and computer program product for providing dynamic group subscriptions for M2M device communication provides a more flexible and efficient technology for allocating registrations and resources. Using this technology, network resources are allocated in proportion to the expected resource use. This group activation technique is brought about by the recognition that the communication usage patterns of M2M devices are infrequent and they should not be considered equivalent to other types of communicating devices, such as mobile phones, data cards, or dongles that use the network for extended periods of time. Hence, both from network usage and business reason it is not feasible to consider each M2M device equivalent to a one subscription. As such, based on network usage and business model, it is desirable to consider a group of devices to be equivalent to one subscriptions or to a plurality of subscriptions fewer in number than the number of devices in the group. This is done by a process to allocate a given number of subscriptions among the devices of the group. The method includes a flexible process to allocate and deallocate subscriptions to devices within the group.

For example, a method for allocating a plurality of subscriptions to wireless services in a network among a plurality of wireless devices in the network comprises creating a group including a plurality of wireless devices, making an initial allocation of the subscriptions to the group, the initial allocation including allocating one subscription to each of some of the plurality of wireless devices, modifying the allocation of the subscriptions to the group, including at least one of deallocating a subscription from one of the plurality of wireless devices and allocating a subscription to one of the plurality of wireless devices.

The method may be performed at a gateway device. The method may further comprise communicating from the gateway device to a subscription registry a currently allocated subscription for a wireless device. The subscription registry may comprise an HLR, an AAA server, a PDSN, a DHCP server, or an Access Point. The plurality of wireless devices may be greater in number than the plurality of subscriptions to wireless services. Membership of a device in a group may be ascertained by at least one of a device identifier, geolocation information, a device identifier range, and a device type. The group may be created in response to a request from an entity external to the network. The allocation of the subscriptions to the group may be modified in response to a request received from an entity external to the network. The allocation of the subscriptions to the group may be modified in response to a request received from an entity in the network. Information relating to a subscription comprises a tuple including a wireless device identifier and a resource identifier. The resource identifier may comprise at least one of an MSISDN, an IP address, a Port Number, a Resource ID, and a subscriber ID. The device identifier may comprise at least one of an IMEI, an ESN, an IMSI, a MAC, a VIN, an SKU, an EPC, and a GUID.

As another example, an M2M gateway may categorize devices as belonging to groups based on the identity of the device. The gateway may further determine which of the devices that connect to the network belong to a given group. The gateway may maintain a catalog of several groups of such devices identifying each group by a group identifier.

As another example, an M2M gateway may store the mapping between the identity of a device and the group to which the device belongs. The devices within each group are considered as those that are to be dynamically activated. The gateway may further determine which of the devices that connect to the network belong to this group.

As another example, a request by the M2M gateway to allocate a fixed set of K subscriptions to a group consisting of N devices may be processed. This provides the capability to support the number of required activations being less than or equal to the number of devices within the group. Further, a rule may be specified to decide the membership of the device to a group based on the identity of the device.

As another example, the M2M gateway may generate an activation allocation record consisting of the group identifier and the resources allocated for purposes of billing after a given set of K resources are allocated to a group consisting of N devices.

As another example, the membership of a device to a given group may be based on the identity of the device. The said identity may be IMEI, IMSI, MEID, ESN, SKU, VIN, EPC, MAC or any other well know identifier that is associated with a communicating device.

As another example, the M2M gateway may process a network-initiated request to allocate a subscription for a device which then maps the network resource such as phone number or an IP address to the device from the available pool of activations allowed for this group of devices. The device may then be considered activated in the network.

As another example, the M2M gateway may process the request for a device-initiated request to allocate a subscription which is then forwarded to the external entity responsible for the group to determine if such a request is to be granted.

As another example, the M2M gateway may reject an activation request when all the network resources such as phone number, IP address, etc., are allocated to other devices within the group. The device may then be considered not activated.

As another example, the M2M gateway may process the request to deactivate a device, which then unmaps the network resource such as phone number, IP address, etc., from the device and returns it to the available pool of activations for this group of devices. The device may then be considered no longer activated.

BRIEF DESCRIPTION OF THE DRAWINGS

The details of the present invention, both as to its structure and operation, can best be understood by referring to the accompanying drawings, in which like reference numbers and designations refer to like elements.

FIG. 4 is an exemplary format of a resource allocation table indicating resources allocated to a group.

DETAILED DESCRIPTION OF THE INVENTION

A method, system, and computer program product for providing dynamic group subscriptions for M2M device communication provides a more flexible and efficient technology for allocating registrations and resources. Using this technology, network resources are allocated in proportion to the expected resource use. For example, if a device uses 1/10th of the resources as a traditional mobile subscriber then it should be allocated only 1/10th of the network resources and hence should be considered 1/10th of a subscription. The present invention offers a solution to allocating a set of subscriptions to a group of devices so that the subscriptions can be dynamically allocated and deallocated as the need arises and the expected resource usage from a group of N devices.

Figure 1:
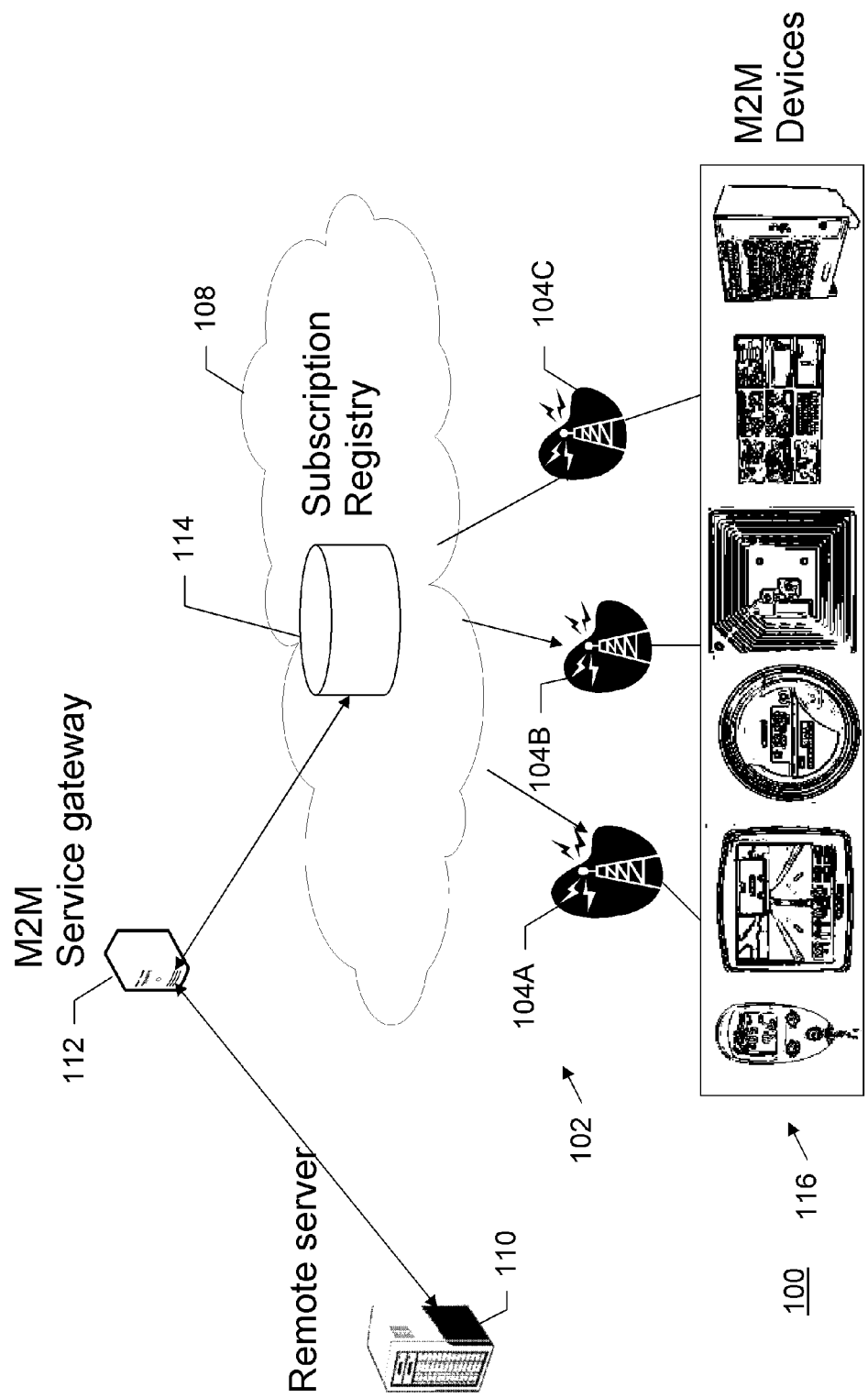
FIG. 1 is an exemplary diagram of block diagram of a network system in which the present invention may be implemented.

Abbreviations used herein include:
3G—Third Generation Cellular networks
4G—Fourth Generation Cellular networks
AAA—Authentication, Authorization, and Accounting
CDMA—Code Division Multiple Access
DHCP—Dynamic Host Configuration Protocol
EIR—Equipment Identity Register
EPC—Electronic Product Code
ESN—Electronic Serial Number
GSM—Global System for mobile communication
GUID—Globally Unique IDentifier
HLR—Home Location Register
IMEI—International Mobile Equipment Identity
IMSI—International Mobile Subscriber Identity
LTE—Long Term Evolution
M2M—Machine to Machine
MAC—Media Access Control address
MEID—Mobile Equipment Identifier
MNO—Mobile Network Operator
MSISDN—Mobile Subscriber Integrated Services Digital Network Number
MVNE—Mobile Virtual Network Enabler
MVNO—Mobile Virtual Network Operator
PDSN—Packet Data Serving Node
SKU—Stock Keeping Unit
VIn—Vehicle Identification Number
WiFi—a class of WLAN devices based on the IEEE 802.11 standards.
WLAN—Wireless Local Area Network
WiMAX—Worldwide Interoperability for Microwave Access M2M communication refers to devices that are provided with wireless connectivity, including, for example, cellular technologies, to communicate with remote applications. The desired functionality from these devices may include sensing, telemetry, telematics, remote measurement, and remote management. FIG. 1 illustrates an exemplary embodiment of a wireless network 100 in which the present invention may be implemented. Network 100 includes a radio access network 102, which includes a number of base stations 104A-C that communicate with a set of wireless devices, such as M2M devices 106, and a backbone network 108, which is connected to various servers, such as remote server 110, gateways, such as gateway 112, and subscription registry 114. For those skilled in the art, the wireless technology can be any of the schemes available to communicate wirelessly with a device. Examples include GSM, CDMA, GPRS, WiFi, WiMAX, LTE, RFID, etc. The described embodiments are directed at devices 116, which may include devices such as smart phones, energy meters, vending machines, appliances, digital signage, automobiles, navigation devices, picture frames, health care, and sensors that can wirelessly communicate with remote applications.

Gateway 112 is an M2M gateway apparatus that communicates with external entities as well as elements within the network. The mobile wireless network belonging to the mobile network operator (MNO), mobile virtual network operator (MVNO) or an enterprise responsible for operating the wireless network and as such implement one more elements needed for service enablement to subscribers. These network elements may include a subscription registry 114, which may be implemented in an HLR, an AAA server, a DHCP server or any other device that maps the Subscriber with any resource allocated. The external entity may be any remote application or device that communicates with the M2M devices using the wireless network.

Traditionally, in mobile wireless networks, when a device is activated to use any of the services, a mobile phone number or MSISDN is associated with a phone and together with a subscriber identifier such as IMSI or ESN defines the subscription and services subscribed by the user. In other networks such as WiMAX, when a device is activated, the MAC address of the data card defines the subscription along with the subscriber-ID. The association between the device and the subscription identifier is maintained in subscription registry such as the HLR or AAA server. The charges for any service include a minimum recurring charge for maintaining the subscription. So, for each device that is activated on the network, there is a cost associated with the activation process. Also, once activated, the mapping between the phone number and the device stays the same for relatively long periods of time, unless there is a change in the subscription brought about by a change in the device or unless the user or the mobile operator decides to change the subscription.

In the case of M2M devices, the number of devices in use is expected to be in the billions. Mobile network operators (MNOs) and Mobile Virtual Network operators (MVNOs) are deploying M2M services in addition to traditional voice and data services. The traffic characteristics of M2M devices are different from the characteristics of conventional traffic, such as voice and data communication enabled by mobile phones, smart phones, data dongles and data cards. M2M devices only require periodic communication and typically send only a small amount of data, such as a few bytes of data, to a remote application. Likewise, communication to M2M devices is typically small in size, such as a request to execute a management operation from a remote entity such as a device management server. Hence, it is not cost effective to consider each M2M device as a separate subscription each requiring a permanent subscription with an allocated resource such as a phone number, IP address or a port.

The present invention is based on the recognition that an M2M device individually does not consume the same amount of network resources as a traditional mobile phone and should not be considered as a separate subscription. While these devices need to send and receive data, they do it occasionally and hence there is no need to have the device activated all the time. Instead, M2M devices are grouped so that network resources and subscriptions can be associated with the group. The actual resources allocated within the group can then be adjusted on an as needed basis. To accomplish this, the present invention provides a dynamic policy-based activation of M2M devices so that the usage of network resources is commensurate with the activity imposed by a group of M2M devices.

In order for M2M devices to communicate over a network, the devices have to be registered with the network. To uniquely identify a device, each device is associated with a device identifier. Examples for device identifiers include the IMEI, IMSI, ESN, MEID, EPC, SKU, MAC, etc. Each of these is used in different networks. For example, GSM uses the IMSI, CDMA uses the ESN or the MEID, WiMAX uses the MAC. This immutable device identifier is stored in the core network and many of the network processes use the device identifier to determine the needed actions when the device connects. In device management, each device registers with its device ID so that the management server can check the device against its inventory. Similarly, mobile operators allow ranges of device identifiers to be allowed on the network by preloading the set of allowed device identifiers in a registry such as HLR, EIR, DHCP, or AAA.

While the device identifier is used to identify the legitimate devices that can be allowed access to the network, another identifier geared towards subscribers is also used to define the credentials for the subscriber and to determine the services to enable. The subscriber identifier can be a separate identifier such as IMSI or could be a subscriber ID that is associated with a billing system or a routable identity such as MSISDN or IP address. A combination of subscriber identifiers or subscriber identifier and device identifier defines a subscription.

A subscription can be considered as a tuple <device-ID, subscriber-ID>, where the mapping is established in the network when the device is activated and provisioned for services. The subscription information is maintained in a registry such as HLR, or AAA. For example, in GSM networks, the subscription is <IMSI, MSISDN>, in CDMA it is <ESN, MSISDN>, and in WiMAX it is <MAC, subscriber_ID>. While these are examples, the invention described herein is no way limited and can apply to other networks where the subscription is any combination of a subscriber identifier and a device identifier.

In order to receive service, a device needs to be activated on the network. The activation process consists of providing user billing data and completing the subscription for the user by associating the device identifier with a subscription identifier and storing the subscription in a registry such as the HLR or AAA. Any service initiation, either network initiated or device initiated, will check for a complete subscription in a subscription registry, after which the network elements will enable the proper routing of the service to and from the device. If the subscription registry is incomplete or the service is not enabled, the device will be denied access to the network or service. The core network elements, such as the HLR or AAA, maintain the subscription information. Visiting registries, such as the VLR, can always query the home subscription registry to confirm the validity of the subscription and provide or deny service. The subscription binds the device to the user and is relatively permanent unless there is a change in the device or service.

The subscription completion can happen in two ways: off-line or on-line. In the off-line process, an external entity, such as a service provider portal, communicates with the subscriber registry and completes the subscription by associating the subscriber-ID to the device identifier. In the on-line process, a pre-registered device is allowed to access the network, but any request will be routed to a service activation center, which is then responsible to complete the association between the subscriber-ID and the device identifier. An example of such a service is the 611 customer service call that can be placed by any device, provided the device is registered in the network. In on-line activation, the device uses the network to complete the activation, whereas in off-line activation, activation has to be complete prior to accessing the network.

These mechanisms for activation are useful when there is a one-to-one mapping between the subscriber-ID and the device identifier and each subscription is a billable entity. In M2M devices, there is a need to consider a group of devices as equivalent to one or more subscriptions without having to always maintain a one-to-one relationship between device identifier and subscriber-ID. The present invention provides the capability to dynamically map the subscriber_ID to the device identifier as and when the device needs to communicate or the network needs to communicate.

Figure 2:
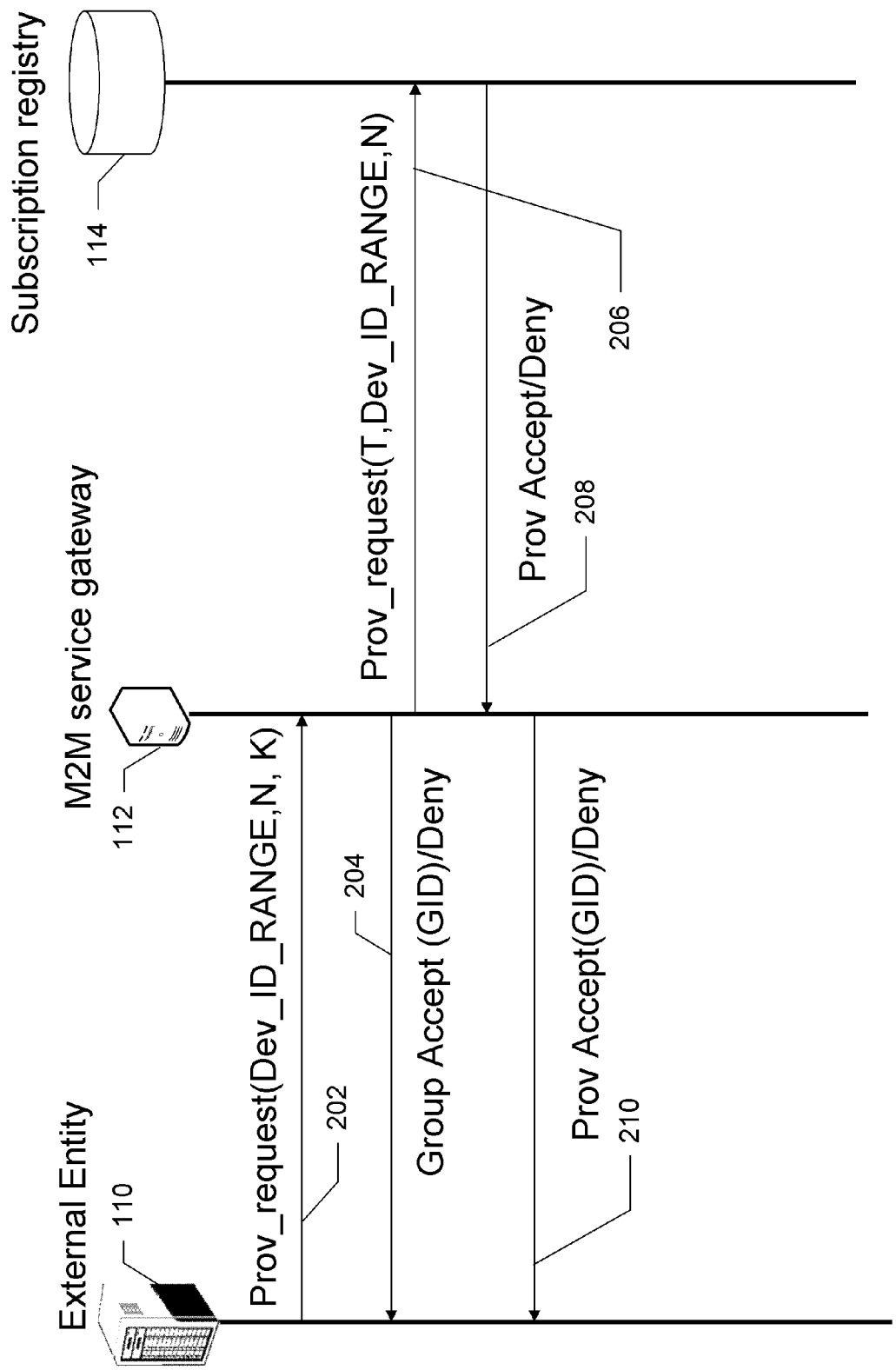
FIG. 2 is an exemplary flow diagram of signaling relating to provisioning of subscriptions to a group.

FIG. 2 is an exemplary diagram illustrating the interactions between the M2M service gateway 112, external entity, such as remote server 110, and the subscription registry 114, shown in FIG. 1. The external entity that manages the M2M devices generates and transmits a request 202 to M2M service gateway 112 to create a group, specify the set of devices 'N' within the group and the maximum number of active subscriptions 'K'. The group membership can be determined by the type of device, the device identifiers, a range that includes starting serial number, and the number of devices to be included in the group. Once the device group is established, the devices with the group will be considered as one unit for controlling the number of active subscriptions. M2M service gateway 112 after executing the necessary authentication procedures, either accepts or denies the request to create a group with N devices and K, the associated number of subscriptions, and transmits Group Accept/Deny message 204, which includes the Group Identifier (GID) of the created group, if the request is accepted and the group created. Once the request to create a group is accepted, M2M service gateway 112, maintains a table, such as the example shown in FIG. 4, which specifies the GID, devices in the group (N) and the number of resources (K) allocated to the group. The request 206 to provision the devices in the network is sent to the subscription registry 114. Subscription registry 114 authenticates the request 206 to provision the devices in the network, and returns Provision Accept/Deny message 208 to M2M service gateway 112. M2M service gateway 112 then sends a Provision Accept/Deny message 210 message to external entity 110, including the GID, if the provision request was accepted.

Figure 3:
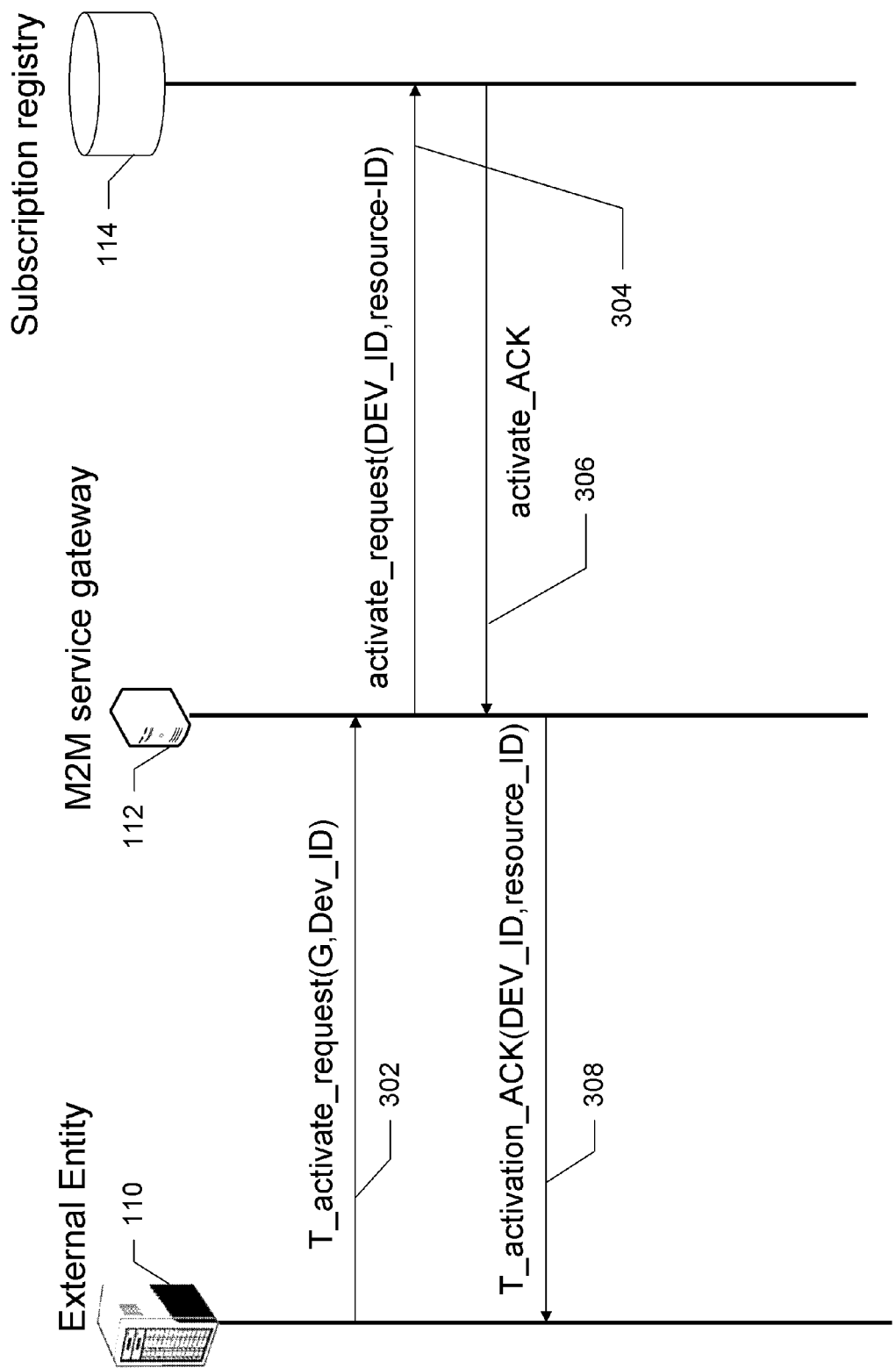
FIG. 3 is an exemplary flow diagram of signaling for network-initiated activation of a device within a group.

FIG. 3 is an exemplary diagram illustrating the interactions between the M2M service gateway 112, external entity 110, and the subscription registry 114 for processing an activation request. The external entity that manages the M2M devices sends a request 302 to activate a device within the group, including identification of the group (GID=G) and the device, to M2M service gateway 112. M2M service gateway 112 checks the existence of the group, the device and the number of available resources and according to a predetermined policy, if any, allocates a resource from within the group and communicates the subscription including a device identifier and a resource identifier to the subscription registry 114 in an activate request message 304. Subscription registry 114 activates the requested subscription and sends an activate acknowledge message 306 to M2M service gateway 112. M2M service gateway 112 receives activate acknowledge message 306 and sends an activation acknowledge message 308 to external entity 110.

FIG. 4 is an exemplary format of a resource allocation table 400. In the example shown in FIG. 4, table 400 includes resource allocations for two groups, G1 and G3. Examples of pertinent information that may be stored in table 400 include a Group Identifier 402, Group Metadata 404, and Device Table 406, which includes Device ID 408, Activation State 410, and Resource 412. Group Identifier 402 identifies the group defined in that portion of the table. Group Metadata 404 includes information relating to the group, such as the range of devices included in the group. Device ID 408 includes device identifiers, Activation State 410 includes associated indicators of whether each device is activated, and Resource 412 includes the associated resources assigned to each activated device.

Figure 5:
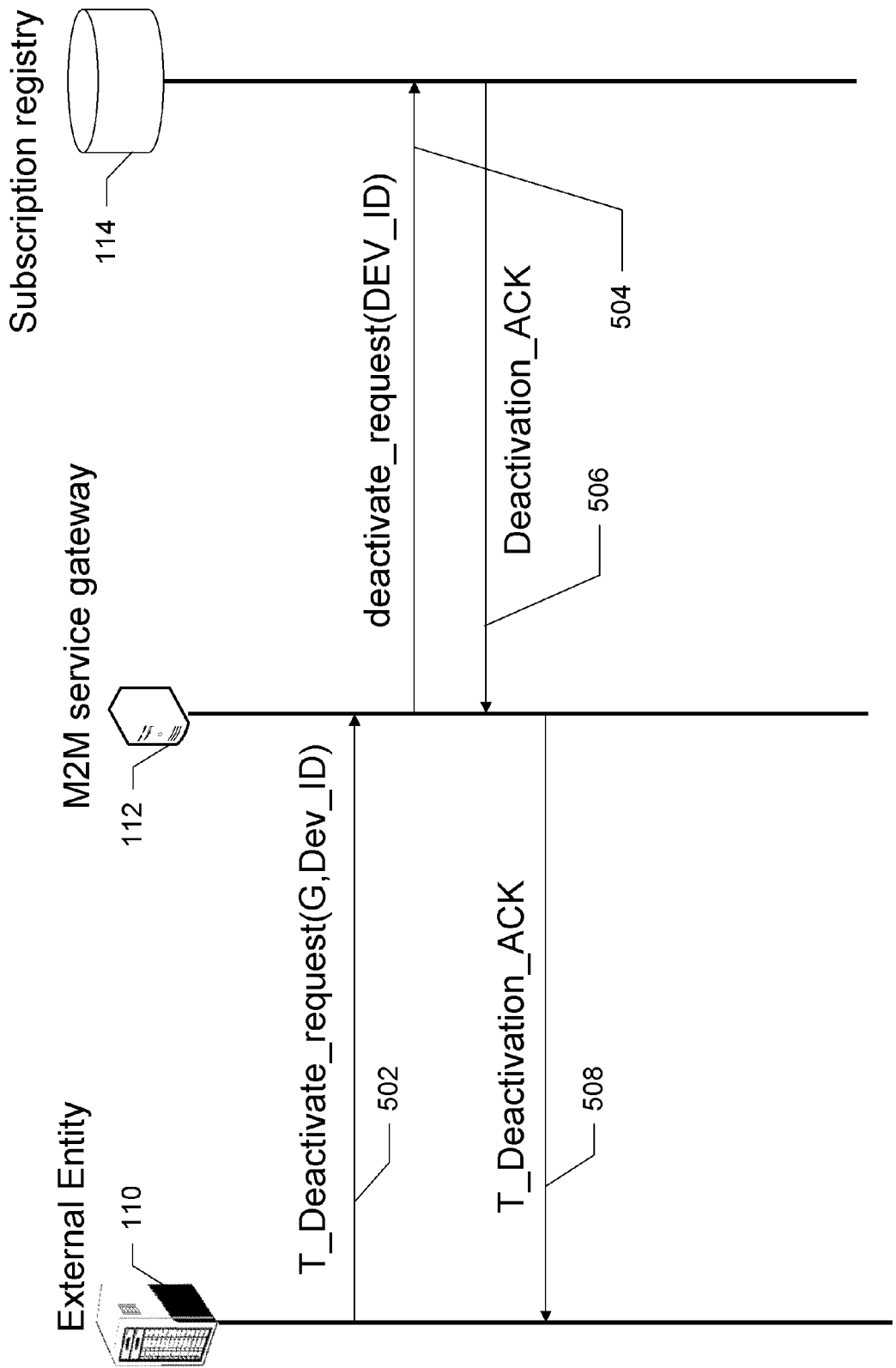
FIG. 5 is an exemplary flow diagram of signaling for network-initiated deactivation of a device within a group.

FIG. 5 is an exemplary diagram illustrating the interactions between the M2M service gateway 112, external entity 110, and subscription registry 114 for processing a deactivation request. The external entity 110 that manages the M2M devices provides a request 502 to deactivate a device within the group, including identification of the group (GID=G) and the device, to M2M service gateway 112. M2M service gateway 112 checks the existence of the group and the device and unmaps the subscription from the said device. The released resource can then be allocated to any other device within the group. M2M service gateway 112 communicates the subscription including a device identifier to subscription registry 114 in a deactivate request message 504. Subscription registry 114 deactivates the requested subscription and sends a deactivate acknowledge message 506 to M2M service gateway 112. M2M service gateway 112 receives a deactivate acknowledge message 506 and sends a deactivation acknowledge message 508 to external entity 110.

Figure 6:
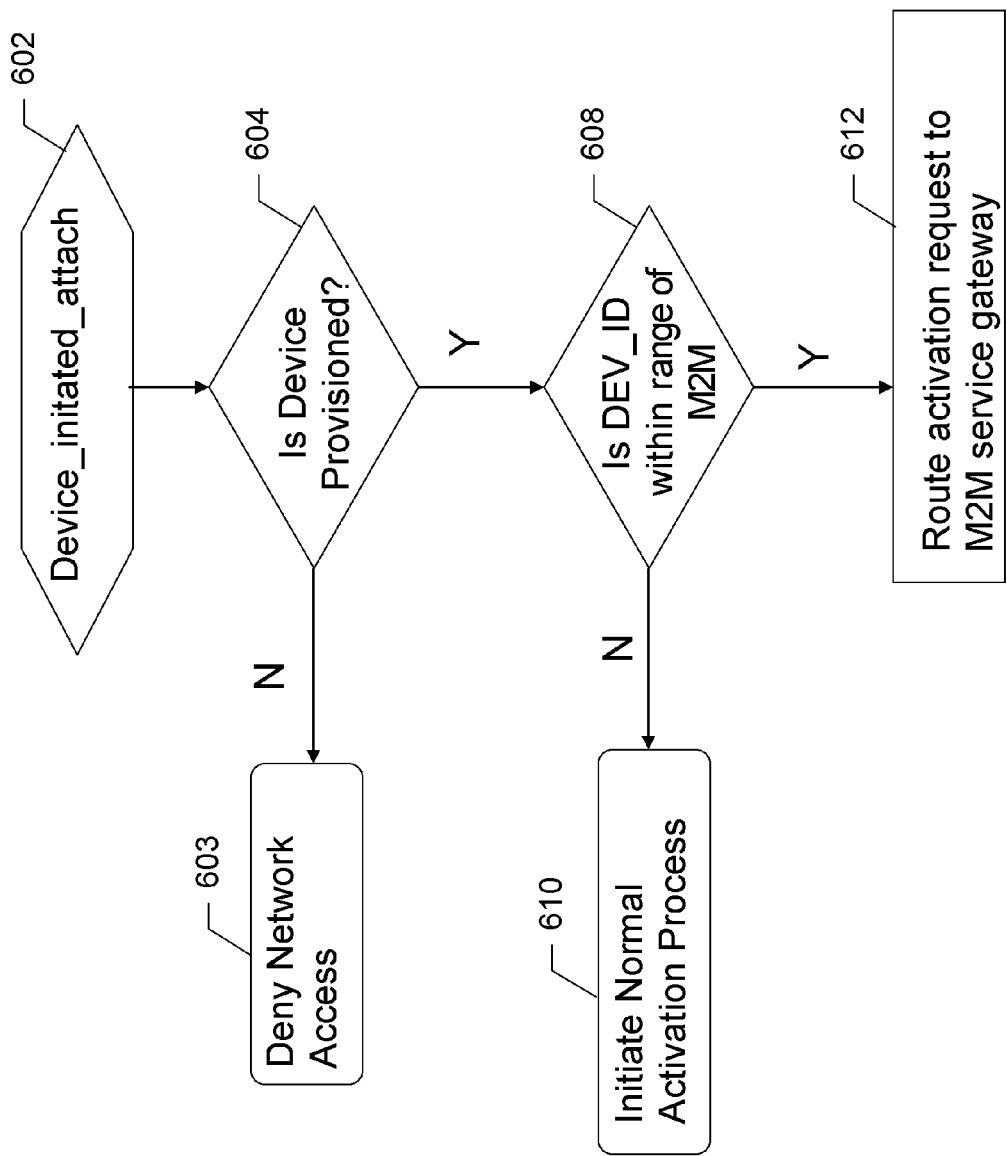
FIG. 6 is an exemplary flow diagram of on-line activation for M2M devices.

FIG. 6 is a flow diagram showing the routing of an activation request that originates from a mobile device. Hotline routing or service activation call (611) for pre-registered devices can be used to route an activation request to the M2M service gateway. A simple provisioning, based on M2M device identifier, in the network, can allow a device originated request for activation to be sent the M2M service gateway. For example, in step 602, an M2M initiates an attach operation. In step 604, it is determined whether or not the device is provisioned. If the device is not provisioned, then in step 606, the device is denied access to the network. If the device is provisioned, then in step 608, it is determined whether or not the identifier of the device (device ID or DEV_ID) is within the range of device IDs belonging to M2M managed devices. If the device is not within the range of device IDs, then in step 610, the device is activated using a normal, non-M2M managed activation process. If the device is within the range of device IDs, then in step 612, the activation request is routed to M2M service gateway 112 for processing. M2M service gateway 112 then communicates this request to the external entity that manages this device (not shown). This way, a device-initiated activation is converted into a network-initiated activation. This process is further shown in FIG. 7.

Figure 7:
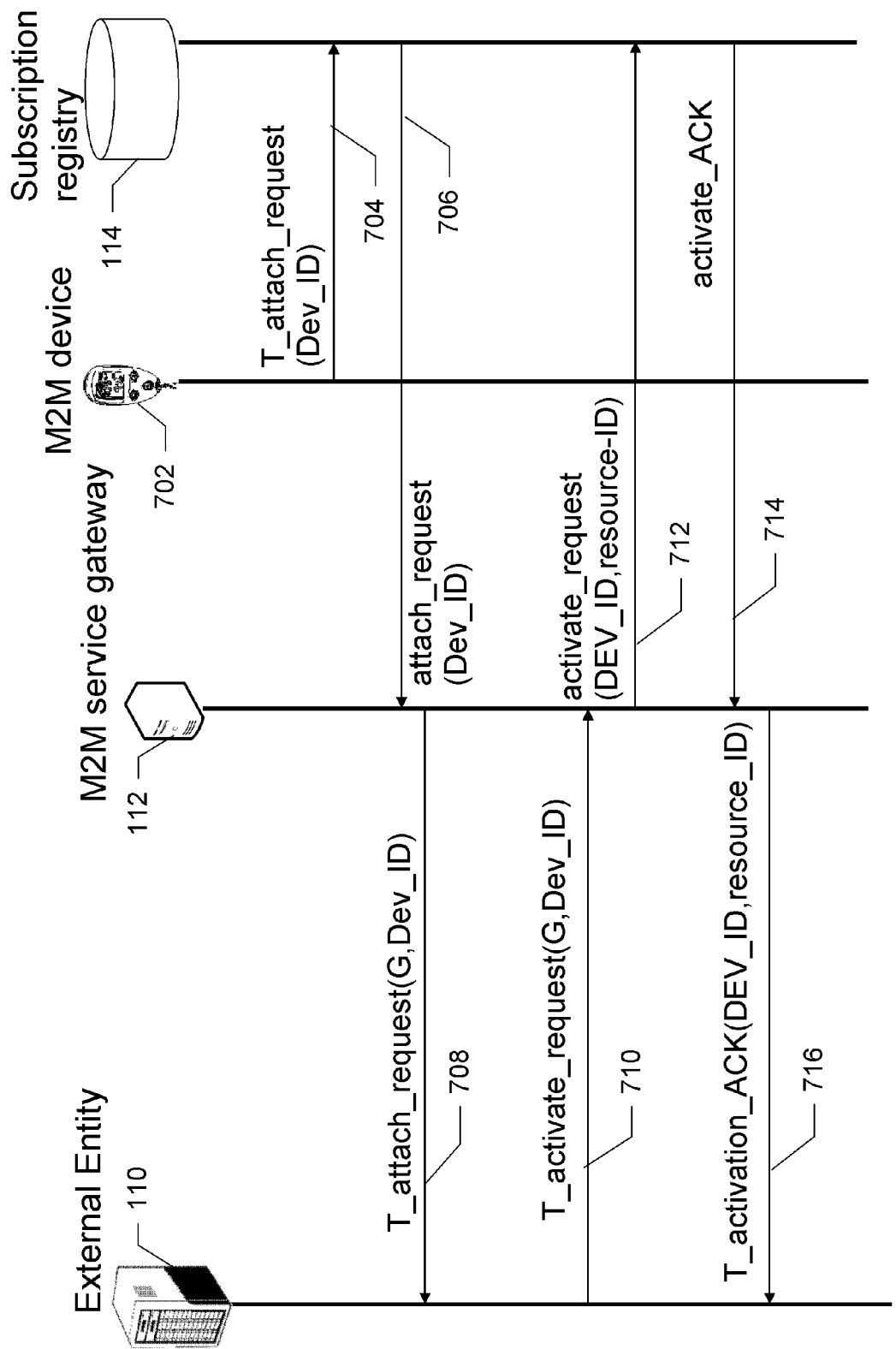
FIG. 7 is an exemplary flow diagram of signaling for processing a device-initiated activation request.

FIG. 7 is a diagram illustrating the interactions between the M2M service gateway 112, external entity 110, subscription registry 114, and M2M device 702 for processing a device-initiated activation request. In this example, M2M device 702 initiates the process by sending a request 704 to attach to the network, including an identifier of M2M device 702, to subscription registry 114. Subscription registry 114 sends a request 706 for M2M device 702 to attach to M2M service gateway 112, request 706 including the identifier of M2M device 702. M2M service gateway 112 determines a group to which M2M device 702 belongs or is to belong and sends a request 708 to attach M2M device 702 to external entity 110, the request including an identifier of M2M device 702 and an identifier of the determined group. External entity 110, which manages the M2M devices, receives the request to attach a device from the M2M service gateway 112. External entity 110 then determines the Group Identifier of the device and sends an activation request 710 to M2M service gateway 112. M2M service gateway 112 then maps a new subscription to the device by allocating a resource from within the group according to a predetermined policy and sends the subscription request 712, including the device identifier and the resource identifier, to the subscription registry 114. Subscription registry 114 then sends an activate acknowledgement 714 to M2M service gateway 112, which sends an activation acknowledgement 716 to external entity 110.

Figure 8:
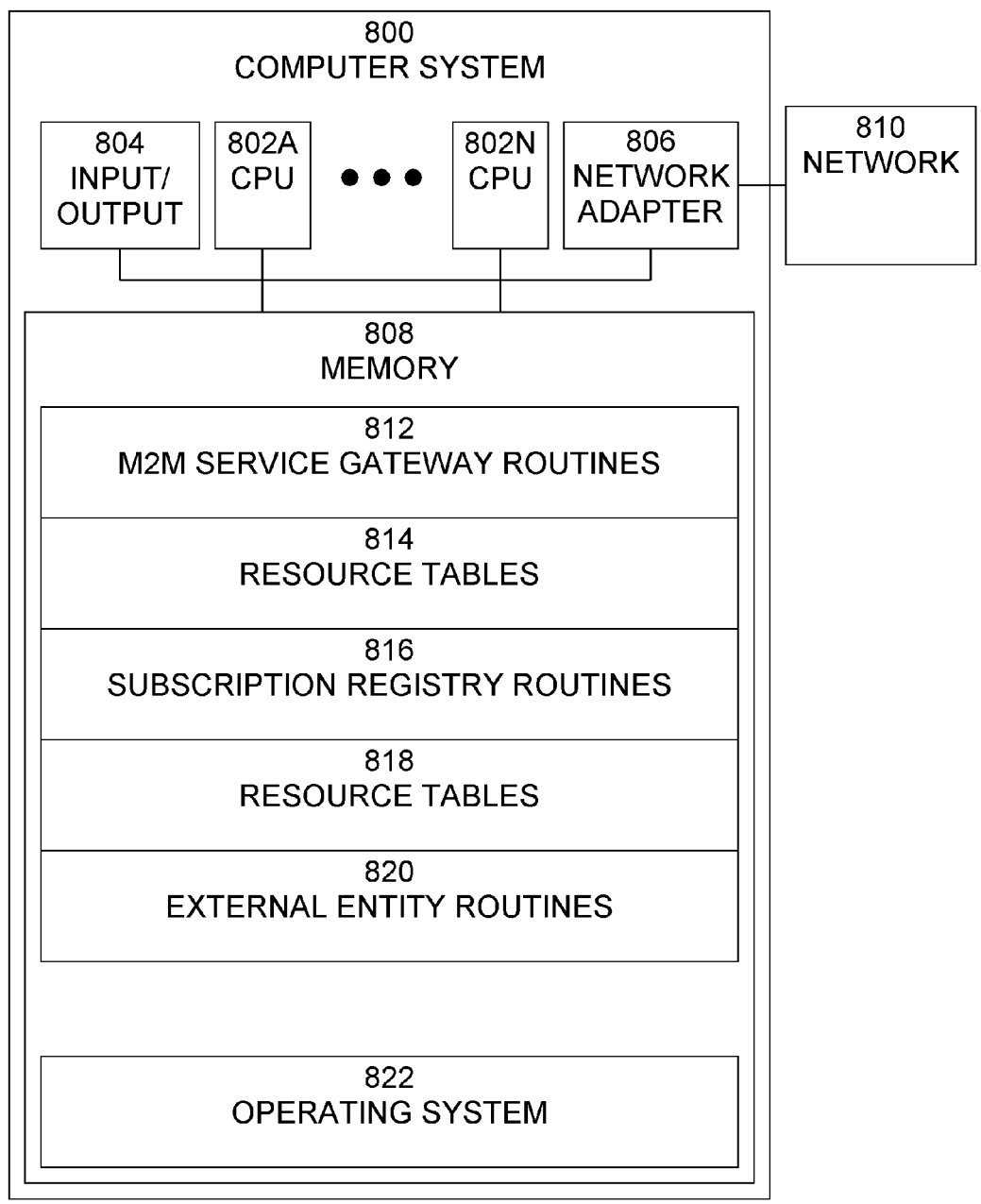
FIG. 8 is an exemplary block diagram of a computer system, such as an M2M service gateway, subscription registry, or external entity, in which the present invention may be implemented.

An exemplary block diagram of a computer system 800, such as an M2M service gateway, subscription registry, or external entity, is shown in FIG. 8. Computer system 800 is typically a programmed general-purpose computer system, such as a personal computer, workstation, server system, and minicomputer or mainframe computer. Computer system 800 includes one and may include a plurality of processors (CPUs) 802A-802N, input/output circuitry 804, network adapter 806, and memory 808. CPUs 802A-802N execute program instructions in order to carry out the functions of the present invention. Typically, CPUs 802A-802N are one or more microprocessors, such as an INTEL PENTIUM® processor. FIG. 8 illustrates an embodiment in which computer system 800 is implemented as a single multi-processor computer system, in which multiple processors 802A-802N share system resources, such as memory 808, input/output circuitry 804, and network adapter 806. However, the present invention also contemplates embodiments in which computer system 800 is implemented as a plurality of networked computer systems, which may be single-processor computer systems, multi-processor computer systems, or a mix thereof.

Input/output circuitry 804 provides the capability to input data to, or output data from, computer system 800. For example, input/output circuitry may include input devices, such as keyboards, mice, touchpads, trackballs, scanners, etc., output devices, such as video adapters, monitors, printers, etc., and input/output devices, such as, modems, etc. Network adapter 806 interfaces device 800 with network 810. Network 810 includes any communications network that is now in service or which may be developed in the future. Such a network may include one or more public or private communications networks, such as the Internet, wired or wireless telephone networks, wired or wireless data networks, local area networks, etc.

Memory 808 stores program instructions that are executed by, and data that are used and processed by, CPU 802 to perform the functions of computer system 800. Memory 808 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface, or Serial AT Attachment (SATA), or a variation or enhancement thereof.

The contents of memory 808 varies depending upon the function that computer system 800 is programmed to perform. For example, where computer system 800 is an M2M service gateway, memory 808 may include M2M service gateway routines 812 and associated data, such as resource tables 814. M2M service gateway routines 812 provide device activation and deactivation services as described above, while resource tables 814 include associated data, as described above. As another example, where computer system 800 is a subscription registry, memory 808 may include subscription registry routines 816 and associated data, such as resource tables 818. Subscription registry routines 816 provide device activation and deactivation services as described above, while resource tables 818 include associated data, as described above. As another example, where computer system 800 is an external entity, memory 808 may include external entity routines 820 and associated data. External entity routines 816 provide device activation and deactivation services as described above.

Operating system 822 provides overall system functionality.

As shown in FIG. 8, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of media actually used to carry out the distribution. Examples of computer readable storage media include, floppy disks, hard disk drives, CD-ROMs, DVDROMs, RAM, flash memory, etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for allocating a plurality of subscriptions to wireless services in a network among a plurality of wireless devices in the network, the method comprising:

creating a group including a plurality of wireless devices;

making an initial allocation of the subscriptions to the group, the initial allocation including allocating a routable identity to each of some of the plurality of wireless devices of the group;

modifying the allocation of the subscriptions to the group, including deallocating a routable identity from one of the plurality of wireless devices and allocating the routable identity to another one of the plurality of wireless devices.

2. The method of claim 1, wherein the method is performed at a gateway device.

3. The method of claim 2, further comprising communicating from the gateway device to a subscription registry a currently allocated subscription for a wireless device.

4. The method of claim 3, where the subscription registry comprises an HLR, an AAA server, a PDSN, a DHCP server, or an Access Point.

5. The method of claim 1, wherein the plurality of wireless devices is greater in number than the plurality of subscriptions to wireless services.

6. The method of claim 1, wherein membership of a device in a group is ascertained by at least one of a device identifier, geolocation information, a device identifier range, and a device type.

7. The method of claim 1, wherein the group is created in response to a request from an entity external to the network.

8. The method of claim 1, wherein the allocation of the subscriptions to the group is modified in response to a request received from an entity external to the network.

9. The method of claim 1, wherein the allocation of the subscriptions to the group is modified in response to a request received from an entity in the network.

10. The method of claim 1, wherein information relating to a subscription comprises a tuple including a wireless device identifier and a routable identity.

11. The method of claim 1, wherein the routable identity comprises at least one of an MSISDN, an IP address, a Port Number, a Resource ID, and a subscriber ID.

12. The method of claim 10, wherein the device identifier comprises at least one of an IMEI, an ESN, an IMSI, a MAC, a VIN, an SKU, an EPC, and a GUID.

13. A computer program product for allocating a plurality of subscriptions to wireless services in a network among a plurality of wireless devices in the network, comprising a non-transitory computer readable storage medium and computer program instructions, recorded on the non-transitory computer readable medium and executable by a processor, for performing the steps of:

creating a group including a plurality of wireless devices;

making an initial allocation of the subscriptions to the group, the initial allocation including allocating a routable identity to each of some of the plurality of wireless devices;

modifying the allocation of the subscriptions to the group, including deallocating a routable identity from one of the plurality of wireless devices and allocating the routable identity to another one of the plurality of wireless devices.

14. The computer program product of claim 13, wherein execution of the computer program instructions is performed at a gateway device.

15. The computer program product of claim 14, further comprising communicating from the gateway device to a subscription registry a currently allocated subscription for a wireless device.

16. The computer program product of claim 15, where the subscription registry comprises an HLR, an AAA server, a PDSN, a DHCP server, or an Access Point.

17. The computer program product of claim 13, wherein the plurality of wireless devices is greater in number than the plurality of subscriptions to wireless services.

18. The computer program product of claim 13, wherein membership of a device in a group is ascertained by at least one of a device identifier, geolocation information, a device identifier range, and a device type.

19. The computer program product of claim 13, wherein the group is created in response to a request from an entity external to the network.

20. The computer program product of claim 13, wherein the allocation of the subscriptions to the group is modified in response to a request received from an entity external to the network.

21. The computer program product of claim 13, wherein the allocation of the subscriptions to the group is modified in response to a request received from an entity in the network.

22. The computer program product of claim 13, wherein information relating to a subscription comprises a tuple including a wireless device identifier and a routable identity.

23. The computer program product of claim 13, wherein the routable identity comprises at least one of an MSISDN, an IP address, a Port Number, a Resource ID, and a subscriber ID.

24. The computer program product of claim 22, wherein the device identifier comprises at least one of an IMEI, an ESN, an IMSI, a MAC, a VIN, an SKU, an EPC, and a GUID.

25. A system comprising a processor operable to execute computer program instructions, a memory operable to store computer program instructions executable by the processor, and computer program instructions stored in the memory and executable to perform the steps of:

creating a group including a plurality of wireless devices;

making an initial allocation of the subscriptions to the group, the initial allocation including allocating a routable identity to each of some of the plurality of wireless devices;

modifying the allocation of the subscriptions to the group, including deallocating a routable identity from one of the plurality of wireless devices and allocating the routable identity to another one of the plurality of wireless devices.

26. The system of claim 25, wherein the system is a gateway device.

27. The system of claim 26, further comprising communicating from the gateway device to a subscription registry a currently allocated subscription for a wireless device.

28. The system of claim 27, where the subscription registry comprises an HLR, an AAA server, a PDSN, a DHCP server, or an Access Point.

29. The system of claim 25, wherein the plurality of wireless devices is greater in number than the plurality of subscriptions to wireless services.

30. The system of claim 25, wherein membership of a device in a group is ascertained by at least one of a device identifier, geolocation information, a device identifier range, and a device type.

31. The system of claim 25, wherein the group is created in response to a request from an entity external to the network.

32. The method of claim 25, wherein the allocation of the subscriptions to the group is modified in response to a request received from an entity external to the network.

33. The system of claim 25, wherein the allocation of the subscriptions to the group is modified in response to a request received from an entity in the network.

34. The system of claim 25, wherein information relating to a subscription comprises a tuple including a wireless device identifier and a routable identity.

35. The system of claim 25, wherein the routable identity comprises at least one of an MSISDN, an IP address, a Port Number, a Resource ID, and a subscriber ID.

36. The system of claim 34, wherein the device identifier comprises at least one of an IMEI, an ESN, an IMSI, a MAC, a VIN, an SKU, an EPC, and a GUID.

* * * * *